United States Patent
Shah et al.

(10) Patent No.: US 12,379,740 B2
(45) Date of Patent: Aug. 5, 2025

(54) TECHNIQUE TO MITIGATE CLOCK GENERATION FAILURE AT HIGH INPUT CLOCK SLEW

(71) Applicant: Taiwan Semiconductor Manufacturing Company, Ltd., Hsinchu (TW)

(72) Inventors: Jaspal Singh Shah, Hsinchu (TW); Atul Katoch, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/344,087

(22) Filed: Jun. 29, 2023

(65) Prior Publication Data

US 2024/0255982 A1 Aug. 1, 2024

Related U.S. Application Data

(60) Provisional application No. 63/482,309, filed on Jan. 31, 2023.

(51) Int. Cl.
*G06F 1/10* (2006.01)
*G06F 1/12* (2006.01)

(52) U.S. Cl.
CPC . *G06F 1/10* (2013.01); *G06F 1/12* (2013.01)

(58) Field of Classification Search
CPC ..................................... G06F 1/10; G06F 1/12
USPC .......................................................... 713/400
See application file for complete search history.

(56) References Cited

U.S. PATENT DOCUMENTS

| | | | |
|---|---|---|---|
| 5,239,237 A | 8/1993 | Tran et al. | |
| 6,335,638 B1* | 1/2002 | Kwong | G06F 1/10 326/28 |
| 6,351,149 B1* | 2/2002 | Miyabe | H03K 17/164 326/77 |
| 6,580,303 B1* | 6/2003 | Harris | G06F 9/3869 327/299 |
| 10,566,959 B1* | 2/2020 | Mittal | H03K 3/35625 |
| 10,818,363 B1* | 10/2020 | Valeri | G11C 16/0483 |
| 11,386,942 B2 | 7/2022 | Jain | |
| 2002/0105312 A1* | 8/2002 | Knight | H02P 25/034 |
| 2002/0118592 A1 | 8/2002 | Wright et al. | |

(Continued)

FOREIGN PATENT DOCUMENTS

KR 20220027744 A1 3/2022

OTHER PUBLICATIONS

Taiwan Office Action; Application No. 112131259; Dated Jun. 18, 2024.

(Continued)

*Primary Examiner* — Paul R. Myers
(74) *Attorney, Agent, or Firm* — Jones Day

(57) ABSTRACT

Circuits and methods are provided for a clock generation circuit that includes a first transistor, wherein a gate of the first transistor is connected to a clock signal, a second transistor, connected in parallel to the first transistor, and a driving circuit, coupled to the second transistor, and comprising an input and an output, wherein the input of the driving circuit is connected to the clock signal, the output of the driving circuit is connected to a gate of the second transistor, and the driving circuit is configured to reduce a slew of the clock signal.

20 Claims, 7 Drawing Sheets

(56) References Cited

U.S. PATENT DOCUMENTS

| | | | |
|---|---|---|---|
| 2003/0183842 A1* | 10/2003 | Kizer | H03L 7/0805 257/158 |
| 2006/0255836 A1* | 11/2006 | Ikeda | H03K 19/00361 326/83 |
| 2007/0290730 A1* | 12/2007 | Dai | H03K 5/1565 327/175 |
| 2011/0032026 A1* | 2/2011 | Pelley | H02M 3/07 327/536 |
| 2011/0084736 A1* | 4/2011 | Papaefthymiou | G06F 1/04 327/108 |
| 2011/0102039 A1* | 5/2011 | Shin | H03L 7/0816 327/175 |
| 2013/0070537 A1* | 3/2013 | Sato | G11C 7/1057 365/189.05 |
| 2015/0002201 A1* | 1/2015 | Kitagawa | H03K 5/1565 327/175 |
| 2018/0302073 A1* | 10/2018 | Ko | H03K 5/05 |
| 2020/0020280 A1 | 1/2020 | Han et al. | |
| 2020/0020361 A1* | 1/2020 | Jain | G11C 11/417 |
| 2020/0365214 A1 | 11/2020 | Valeri et al. | |
| 2021/0201740 A1 | 7/2021 | Kim | |
| 2023/0115436 A1* | 4/2023 | Yang | H03K 5/1565 327/175 |
| 2023/0343389 A1* | 10/2023 | Shamanna | H03K 3/355 |

OTHER PUBLICATIONS

Korean Office Action; Application No. 10-2024-0013905; Dated Oct. 26, 2024.
Taiwan Notice of Rejection Decision; Application No. 112131259; Dated Mar. 4, 2025.
Korean Office Action; Application No. 10-2024-0013905; Dated May 26, 2025.

* cited by examiner

TECHNIQUE TO MITIGATE CLOCK GENERATION FAILURE AT HIGH INPUT CLOCK SLEW

CROSS-REFERENCE TO RELATED APPLICATIONS

This application claims priority to U.S. Provisional Application No. 63/482,309 filed Jan. 31, 2023, which is incorporated herein by reference in its entirety.

BACKGROUND

Certain semiconductor memory devices, such as static random access memory (SRAM) devices, may use a clock to keep operations in sequence. Some memory architectures use an external clock or a system-on-chip (SOC) clock to generate an internal clock for the memory. The internal clock is used to perform necessary functions of the memory device and signal processing operations. As such, maintaining the integrity of internal clock signals is a key component of efficient and accurate memory operation. Problems with the generation of an internal clock signal can lead to memory architecture failure and, consequently, chip failure.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of circuits, methods, and apparatuses consistent with the present invention and, together with the description, serve to explain advantages and principles consistent with the invention.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The following detailed description is provided to assist the reader in gaining a comprehensive understanding of the methods, apparatuses, and/or circuits described herein. Accordingly, various changes, modifications, and equivalents of the circuits, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Reliable internal clock signal generation is an important factor in functional operation of certain devices, including some memory architectures. For internal clock signals generated from an input clock signal, high slew of the input clock signal may lead to increased risk of internal clock generation failure. The high slew may cause a reset signal of the circuit to trigger too early, thereby disrupting generation of the internal clock signal. Variations in process parameters, voltage, and temperature (PVT), may exacerbate this issue and cause early reset and failure of clock generation, even for architectures where designers and engineers have attempted to control for this problem. The techniques described herein provide circuits, methods, and devices that efficiently address this issue and provide consistent clock signal generation.

Figure 1:
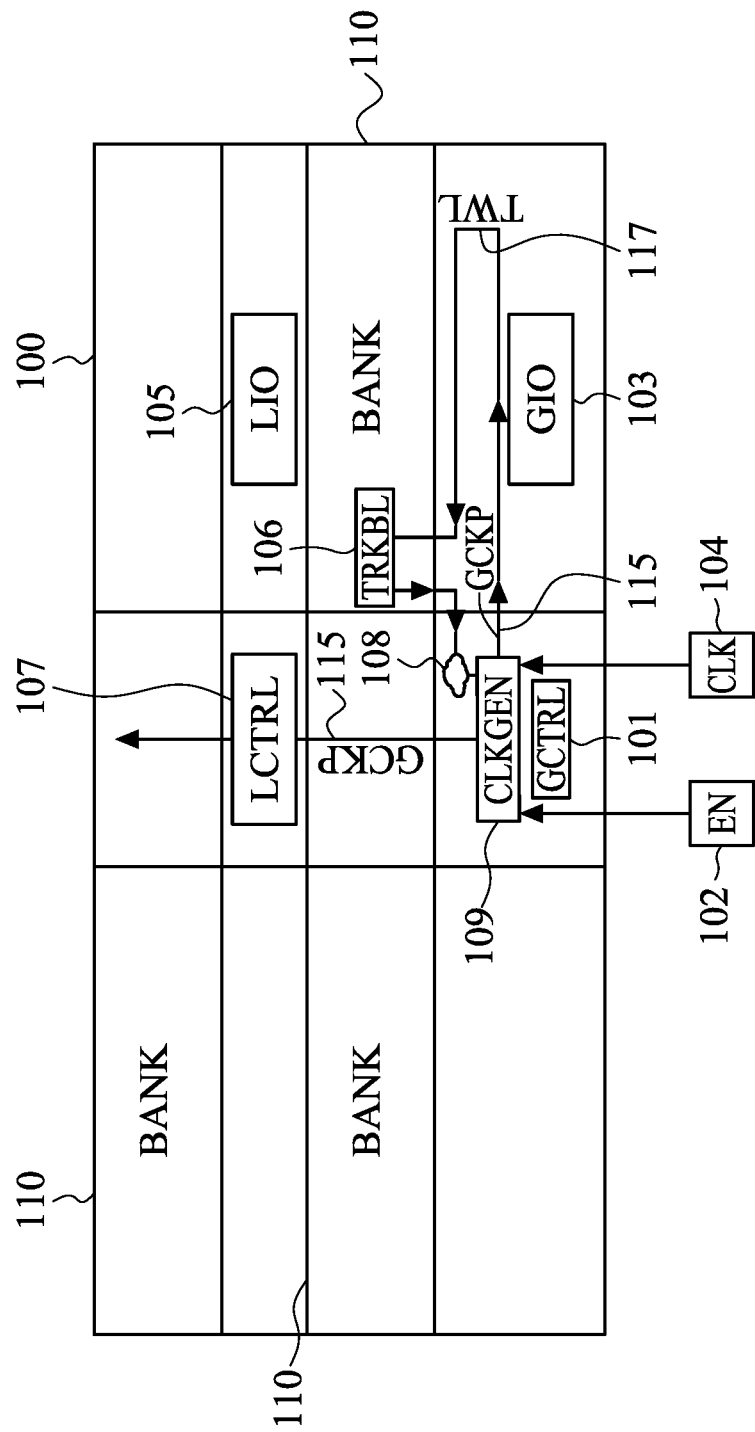
FIG. 1 is a block diagram depicting a memory unit in accordance with an embodiment.

FIG. 1 is a block diagram depicting a memory unit 100 according to an embodiment. The memory unit 100 may be one of a plurality of units making up an overall memory architecture or device. For example, memory unit 100 may be a macro of static random access memory (SRAM) device. In an embodiment, the memory unit 100 may comprise a plurality of memory banks 110 including an array of memory cells that store bits of data. The memory unit 100 may further comprise circuitry for carrying signals through the unit and controlling operations. For example, the memory unit may include a global control (GCTRL) circuit 101, a global input/output (GIO) circuit 103, a local input/output (LIO) circuit 105, and a local control (LCTRL) circuit 107. The LIO circuit 105 and the LCTRL circuit 107 may supply signals from the GCTRL circuit 101 to the memory banks 110, and these signals may control reading and writing operations of the memory. Furthermore, a clock generation circuit (CLKGEN) 109 may be provided to generate an internal clock signal that controls the timing of memory operations.

The CLKGEN circuit 109 may utilize a number of input signals to generate an internal clock signal (GCKP) 115. The input signals may comprise enabling (EN) signal 102 and input clock (CLK) signal 104. The input clock signal CLK may be an external clock signal. During operation, the CLKGEN 109 circuit may send a generated internal clock signal GCKP 115 through the GIO circuit 103. A GCKP signal traversing the GIO circuit 103 may be called a tracking word line (TWL) 117. This signal may discharge a bit-line of tracking bit-cells (TRKBL) 106 in a memory bank 110. The discharged bit line may then send a signal back to the CLKGEN circuit 109. Before reaching the CLKGEN circuit 109, however, the signal is routed through combinational logic 108, becoming a reset (RESET) signal that begins a new cycle for the CLKGEN circuit 109. An example CLKGEN circuit is described below with reference to FIG. 2.

Figure 2:
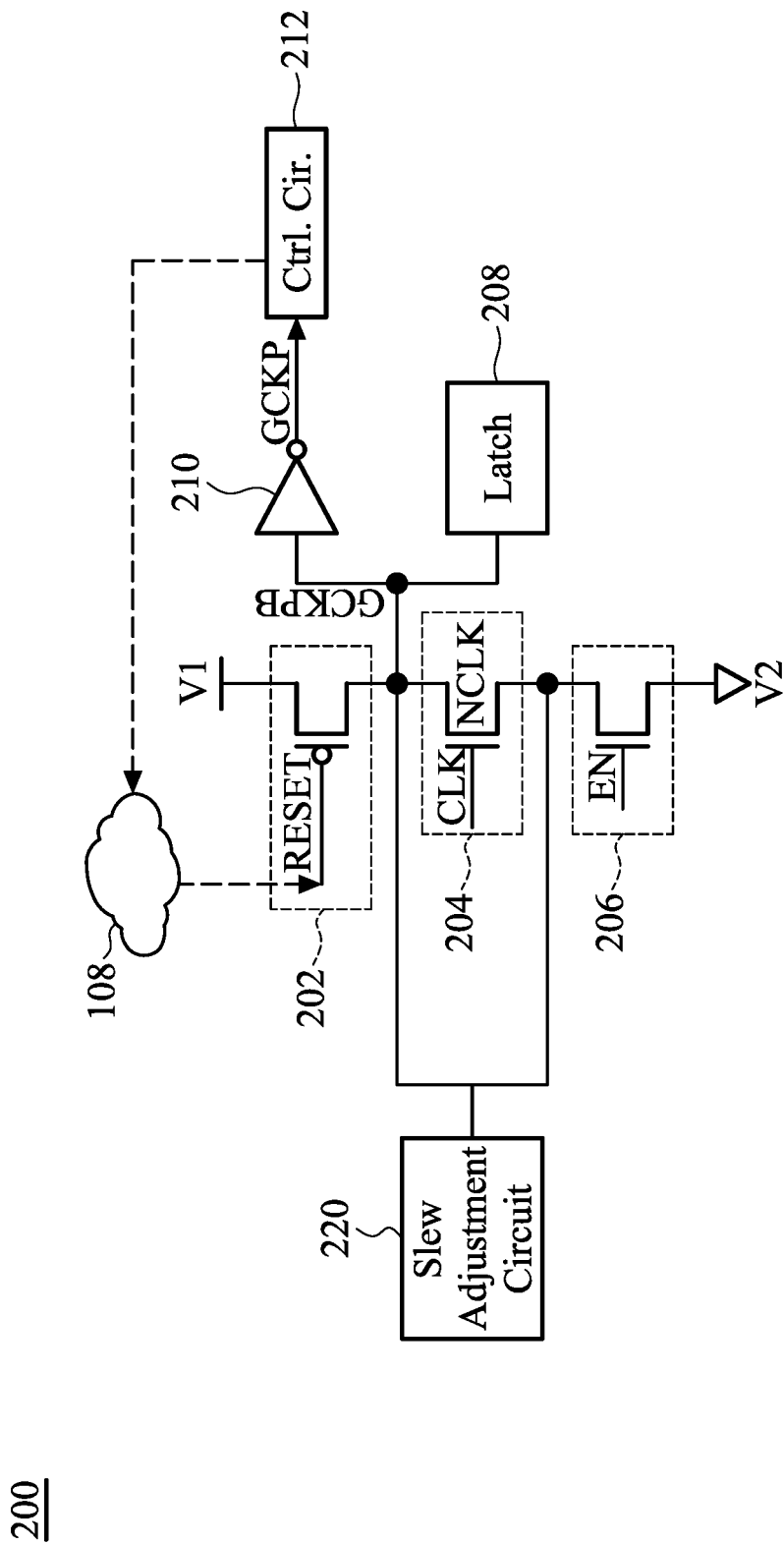
FIG. 2 is a circuit diagram depicting a clock generation circuit according to an embodiment.

FIG. 2 is a circuit diagram depicting a clock generation circuit 200 in accordance with an embodiment. As seen in FIG. 2, CLKGEN circuit 200 may comprise three transistors connected between a first reference voltage V1 and a second reference voltage V2. For example, the circuit may include a reset transistor 202 having a gate coupled to receive the RESET signal, a clock transistor 204 having a gate coupled to receive the input clock (CLK) signal, and an enabling transistor 206 having a gate coupled to receive the enabling signal (EN). The reset transistor 202 may be a p-type metal-oxide-semiconductor (PMOS) transistor, while the clock transistor 204 and the enabling transistor 206 may be n-type metal-oxide-semiconductor (NMOS) transistors. In FIG. 2, clock transistor 204 is a NMOS transistor designated as NCLK.

In an embodiment, the clock transistor 204 may be connected between the reset transistor 202 and the enabling transistor 206 such that a first source/drain of the clock transistor 204 is connected to a first source/drain of the reset transistor 202, and a second source/drain of the clock transistor 204 is connected to a second source/drain of the enabling transistor 206. The enabling transistor 206 may further comprise a second source/drain coupled to the second reference voltage V2, and the reset transistor 202 may further comprise a second source/drain coupled to the first reference voltage V1.

The CLKGEN circuit 200 may further include a latch 208 and an inverter 210. In an embodiment, a node is formed connecting a point between the reset transistor 202 and the clock transistor 204 and a point between the latch 208 and the inverter 210. During operation, the CLK signal may turn on the NCLK transistor 204. When the enabling transistor 206 is also on, an intermediate clock signal GCKPB may be output from the latch 208. This signal may then be sent through inverter 210 resulting generation of internal clock signal GCKP that may control the operation of a connected device such as a memory unit as described above. In this manner, generation of the internal clock signal GCKP may be enabled by the enabling transistor 206. As will be described in greater detail below, the CLKGEN circuit 200 may further comprise a clock slew adjustment circuit 220 that improves the slew of the input clock signal CLK.

After GCKP is output from the CLKGEN circuit 200, it may in some embodiments, be routed through combinational logic 108 to control circuits 212 of a connected device, as indicated by the dashed lines in FIG. 2. For example, the CLKGEN circuit 200 may be connected to a macro of an SRAM, as described above with reference to FIG. 1, and the GCKP signal may be output to the GIO circuit. After traversing the control circuitry 212, the signal may be routed through combinational logic 108, before returning to the CLKGEN circuit 200 as an input RESET signal. The RESET signal may then reset the circuit to a beginning state. In an embodiment, the timing of RESET signal may determine the pulse width of the internal clock signal GCKP. This timing may be based on how long it takes for signals to traverse the circuit, and accordingly may depend on the size of the memory and specifics of the memory device.

In high performance memory devices, the RESET signal may be triggered high when the intermediate clock signal GCKPB is pulled down. At large input CLK signal slews, however, the CLKGEN circuit may not have enough time to generate a GCKP signal before RESET triggers. PVT variations may contribute to this issue, causing early RESET and failure to generate the GCKP signal.

By incorporating the clock slew adjustment circuit 220, the circuits, devices, and methods described herein may provide a clock generation circuit that avoids internal clock signal generation failure. In some embodiments, the clock slew adjustment circuit 220 aids in the avoidance of internal clock generation failure. The circuit modifications are non-invasive at small input clock slews, and provide resistance against early RESET at larger input clock slews.

Figure 3A:
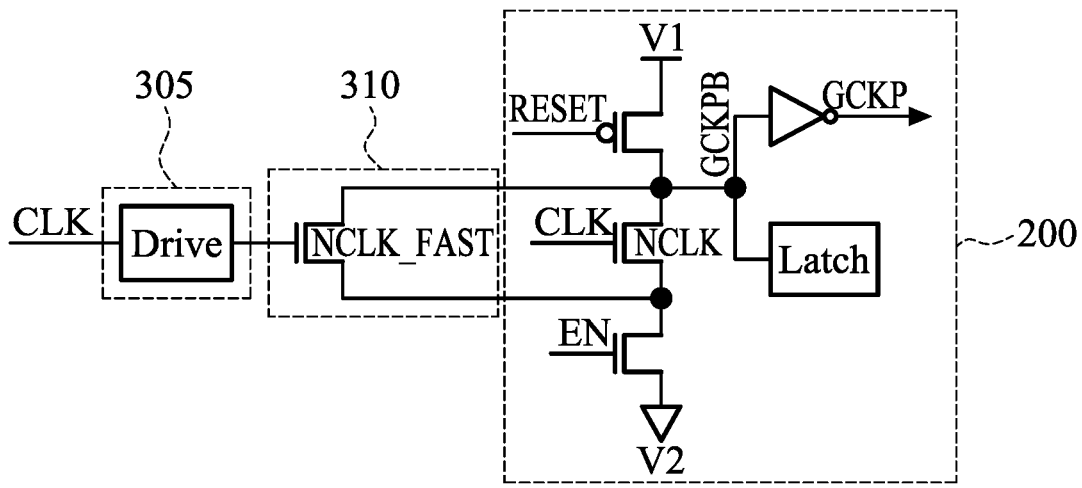
FIGS. 3A-3B are diagrams depicting a clock generation circuit according to an embodiment.

FIG. 3A is a circuit diagram depicting a clock generation circuit 300 according to an embodiment. Clock generation circuit 300 may incorporate the structures of circuit 200, as described above with respect to FIG. 2, into a modified circuit including additional structures. In an embodiment, clock generation circuit 300 further comprises a fourth transistor 310 (NCLK_FAST) placed in parallel with the clock transistor NCLK. This additional transistor NCLK_FAST may be driven by a driving circuit 305. The function of driving circuit 305 is described below with respect to FIG. 3B.

Figure 3B:
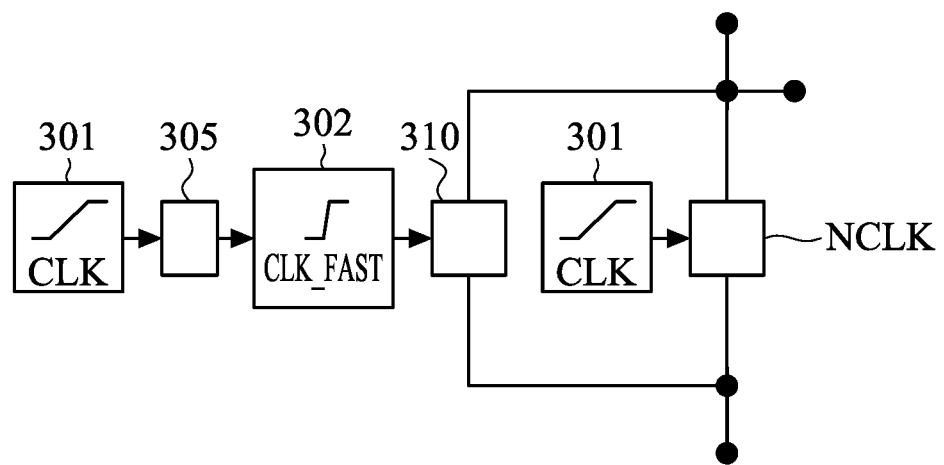

FIG. 3B is a block diagram depicting input signals for a clock generation circuit 300 according to an embodiment. As described above, clock generation circuit 300 may take an input clock signal CLK as input and may use this signal to generate an internal clock signal GCKP. As seen in FIG. 3B, CLK signal may have a first clock slew 301. The driving circuit 305 may take CLK signal 301 as input and may output a second clock signal, referred to herein as CLK_FAST, that has a reduced clock slew 302 as compared to that of the input clock signal CLK. The rate at which CLK_FAST rises from minimum to maximum may be increased with respect to that of CLK. This increased sharpness of the rising edge reduces the amount of time it takes for the signal to reach its peak. Accordingly, the clock slew may be referred to as having been reduced, or improved. Second clock signal CLK_FAST is output from the driving circuit 305 to the gate of transistor NCLK_FAST.

Driving circuit 305 may be configured to reduce the slew of the CLK signal before passing the signal along to drive the NCLK_FAST transistor 310. The presence of NLCK_FAST transistor 310 provides an alternate path for GCKPB to discharge. The reduced slew of CLK_FAST signal may improve the slew of the GCKPB signal and may allow the signal to meet noise margin specification. Furthermore, the improved slew may allow for GCKPB to be pulled down faster and lower, preventing mis-timing of the RESET signal and failure of internal clock generation. Once generated, the GCKP signal may be output to external circuits or devices including, but not limited to, a memory device as described above with reference to FIGS. 1 and 2.

Embodiments of the present subject matter may provide an efficient means to fix the problem of internal clock generation failure, and may be implemented to achieve functional robustness while being non-invasive at smaller slews. Additionally, this solution may be easily ported to different projects and works well with technology scaling. The driving circuit used to generate the CLK_FAST signal having an improved slew may take a number of different forms, as described further with reference to FIGS. 4-5.

Figure 4:
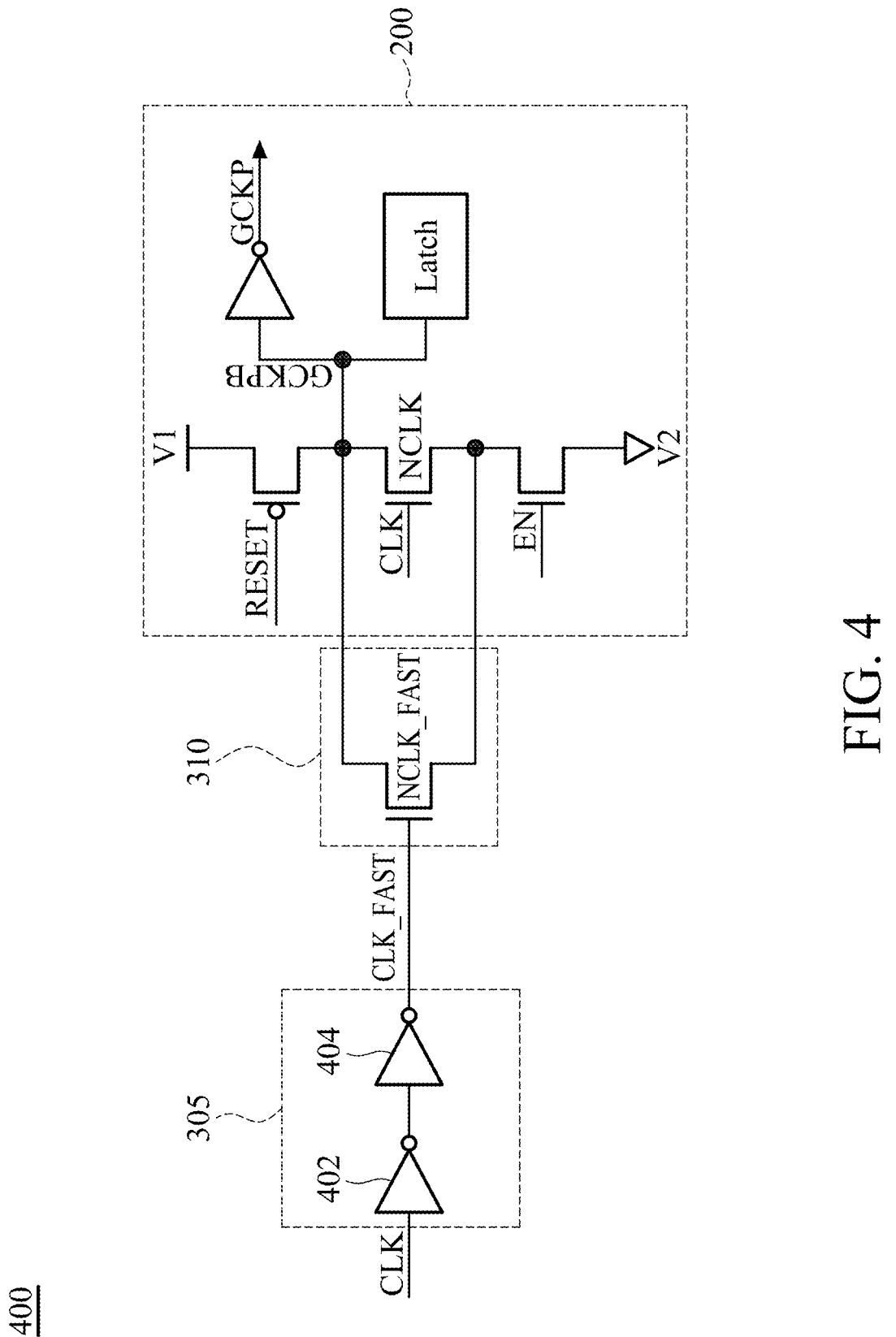
FIG. 4 is a circuit diagram depicting a clock generation circuit according to an embodiment.

FIG. 4 is a circuit diagram depicting a clock generation circuit 400 in accordance with another embodiment. In an embodiment, the clock generation circuit 400 may incorporate the structures of circuit 200, as well as the NCLK_FAST transistor 310. The driving circuit 305 that drives NCLK_FAST transistor 310 may be comprised of a first inverter 402 and a second inverter 404 coupled in series between the input clock signal CLK input and the NCLK_FAST transistor 310.

During operation, input clock signal CLK may be buffered through the pair of inverters, resulting in a signal CLK_FAST having a reduced slew. The first inverter 402 may have an input connected to the input clock signal CLK, and may have an output connected to an input of the second inverter 404. Second inverter 404 takes a signal passed on from the first inverter 402 as input, and outputs CLK_FAST to the gate of NCLK_FAST transistor 310. The components and sizing of components making up the first inverter 402 and second inverter 404 may be any combination of components and sizes selected so as to achieve a sharp signal rise for the output CLK_FAST signal.

The reduced slew of CLK_FAST signal may improve the slew of the GCKPB signal and may allow the signal to meet noise margin specification. Furthermore, the reduced slew may allow for GCKPB to be pulled down faster and lower, preventing mis-timing of the RESET signal and failure of internal clock generation. Once generated, clock signal GCKP may be output to external circuits or devices including, but not limited to, a memory device as described above with reference to FIGS. 1 and 2

Figure 5:
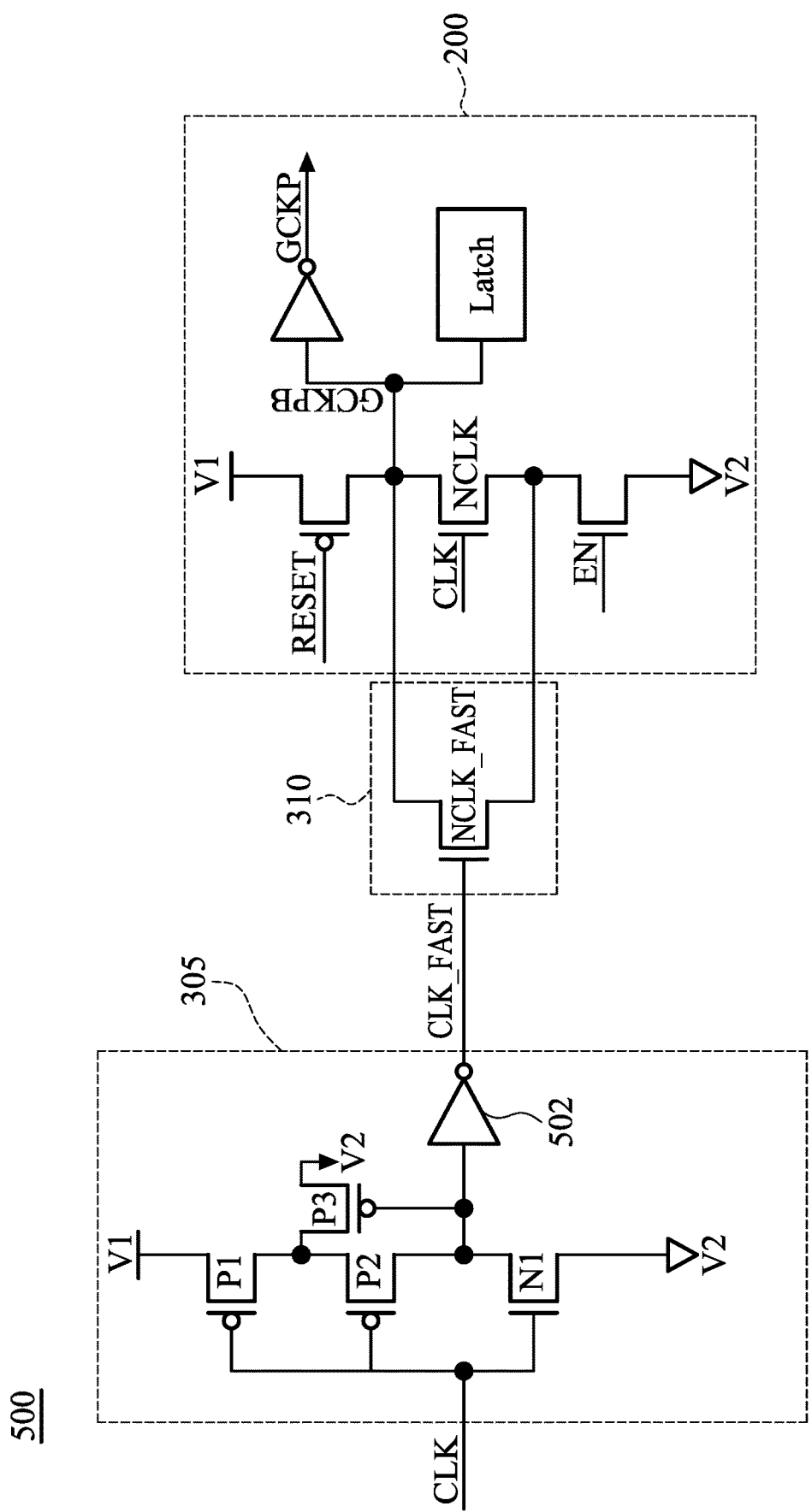
FIG. 5 is a circuit diagram depicting a clock generation circuit according to another embodiment.

FIG. 5 is a circuit diagram depicting a clock generation circuit 500 in accordance with an embodiment. In an embodiment, the clock generation circuit 500 may incorporate the structures of circuit 200, as well as the NCLK_FAST transistor 310. The driving circuit 305 that drives NCLK_FAST transistor 310 may be comprised of an inverter 502 and an arrangement of four transistors.

For example, the driving circuit 305 may include a first p-type transistor P1, a second P-type transistor P2, a third P-type transistor P3, and a first N-type transistor N1. Gates of transistors P1, P2, and N1 may be connected to the input clock signal CLK. A source of transistor P1 may be connected to a first reference voltage V1, which may be the same reference voltage as is connected to the reset transistor. A source of transistor N1 and a drain of transistor P3 may be connected to a second reference voltage V2, which may be the same reference voltage as is connected to the enabling transistor. A drain of the transistor P1 may be connected to a source of the transistor P2 and to a source of the transistor P3. A drain of the transistor P2, a gate of transistor P3 and a drain of transistor N1 may be connected to an input of the inverter 502.

Through this circuit, the inverter 502 may output the signal CLK_FAST having an improved slew to the gate of NCLK_FAST transistor 310. For example, when CLK is high, N1 may be in an on-state and the P-type transistors may be in an off-state, thereby outputting a low output signal. As CLK falls, N1 switches off and the P-type transistors may switch on, thereby outputting a high output signal. The switching characteristics of the transistors may be quick enough such that the output signal transitions at a quicker rate than the input CLK signal. Accordingly, the inverted output CLK_FAST may have an improved slew rate and a reduced slew as compared to CLK. The size and specifics of each transistor and components that make up the inverter in this embodiment may be any combination of devices, components, and sizes selected so as to achieve a sharp signal rise for the output CLK_FAST signal. These may be NMOS and PMOS transistors having channel lengths and threshold voltages selected so as to achieve the desired slew rates.

In this arrangement, the output signal CLK_FAST has a sharper rise as compared to the input clock signal CLK. The reduced slew of CLK_FAST signal may improve the slew of the GCKPB signal and may allow the signal to meet noise margin specification. Furthermore, the reduced slew may allow for GCKPB to be pulled down faster and lower, preventing mis-timing of the RESET signal and failure of internal clock generation. Once generated, the internal clock signal GCKP may be output to external circuits or devices including, but not limited to, a memory device as described above with reference to FIGS. 1 and 2.

Figure 6:
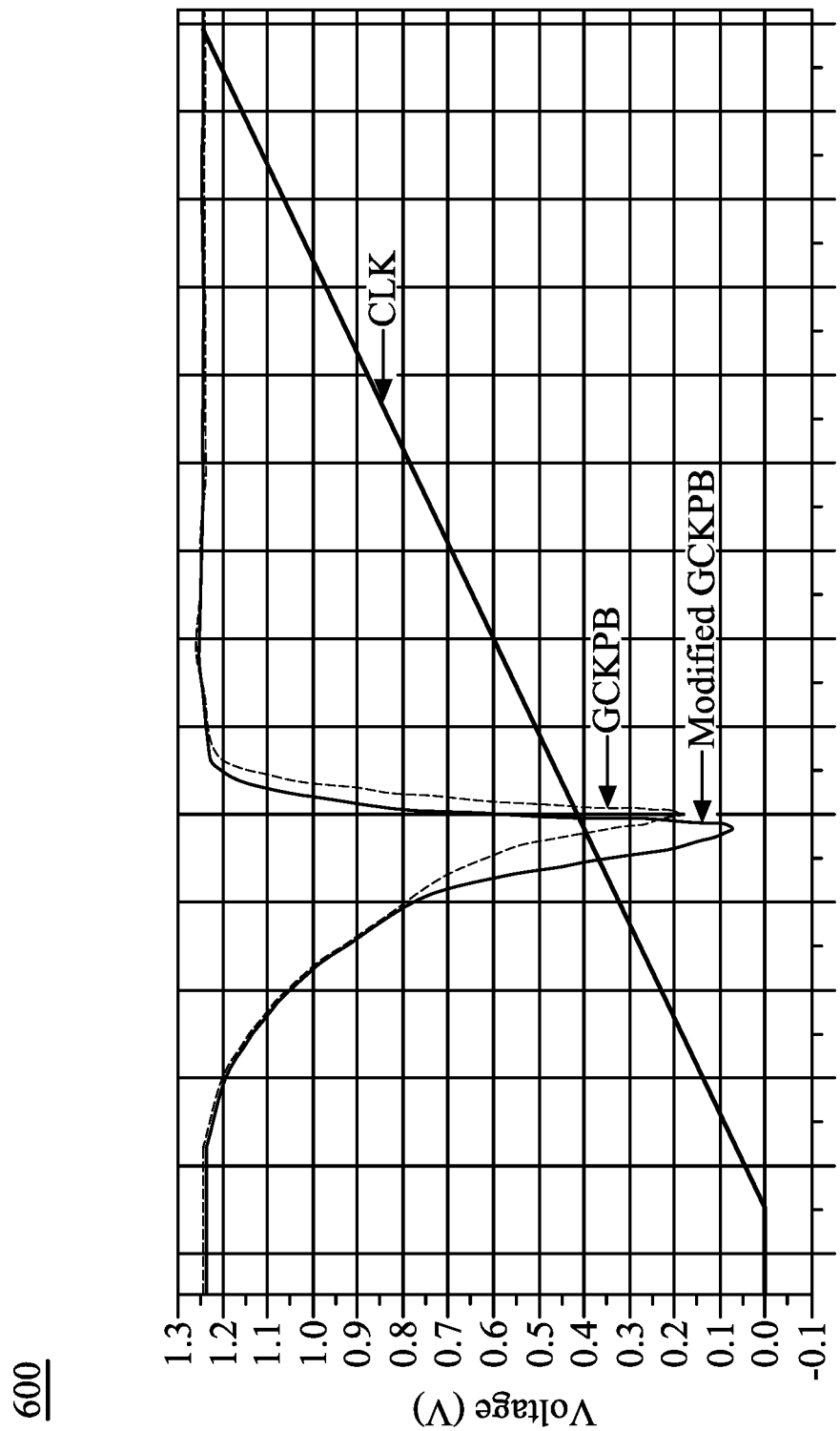
FIG. 6 is a graph depicting signal characteristics of a clock generation circuit in accordance with an embodiment.

FIG. 6 is a graph depicting signal characteristics of a clock generation circuit in accordance with an embodiment. The graph shows the voltage of signals over time, and more specifically, the propagation of a GCKPB signal during the rise of an input clock signal CLK. In FIG. 6, the dashed line depicts propagation of a GCKPB signal in a basic signal, without implementing any of the techniques described herein. The full line depicts propagation of a GCKPB signal according to embodiments of the present subject matter. As shown, circuits described herein may result in the GCKPB signal being pulled down faster and lower. This may mitigate the issue of PVT fluctuations causing a RESET signal to trigger too quickly and result in a failure of internal clock generation.

Figure 7:
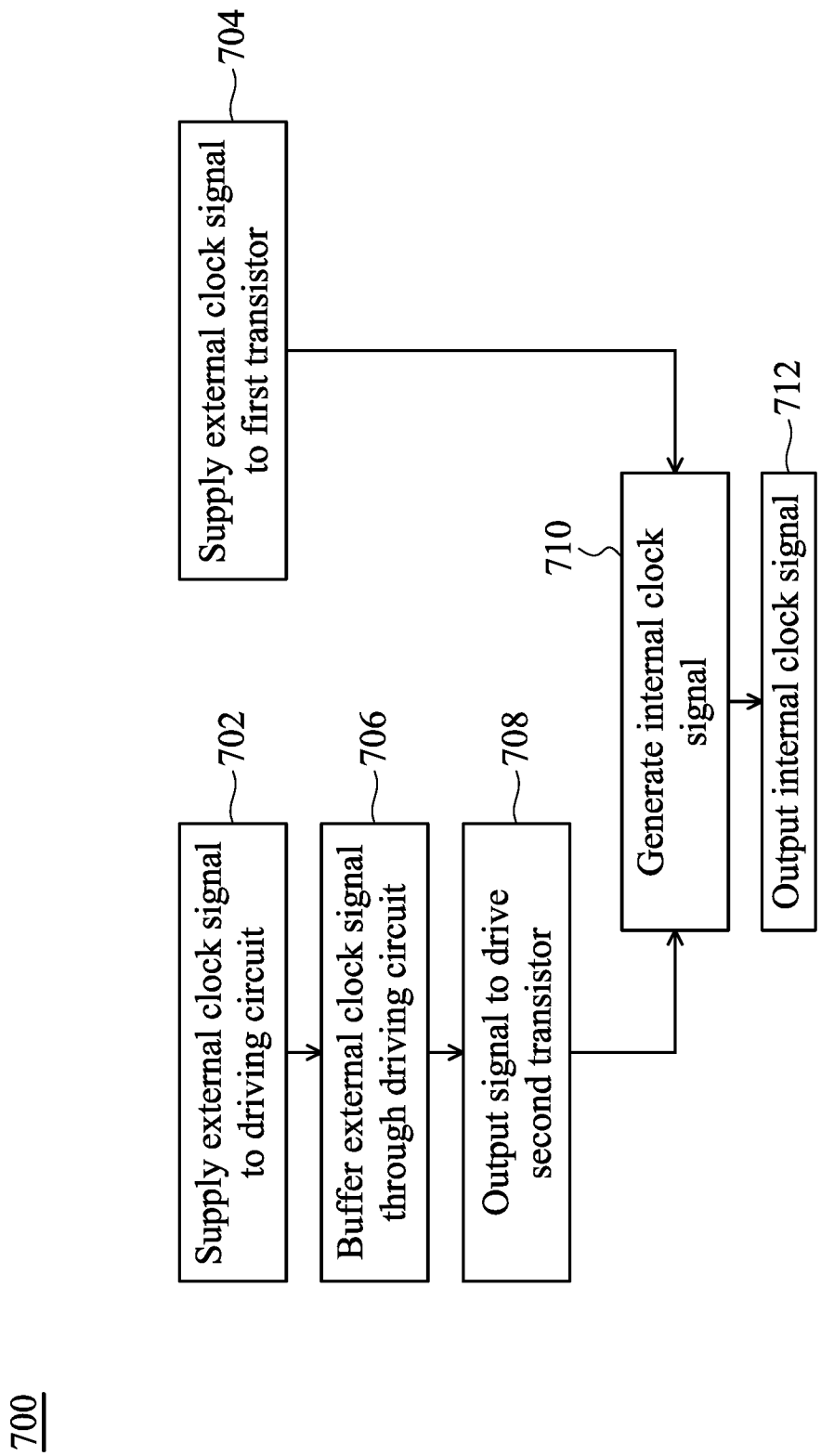
FIG. 7 is a flowchart depicting a method of generating an internal clock signal according to an embodiment.

FIG. 7 is a flowchart depicting a method of generating an internal clock signal according to an embodiment. FIG. 7 is described with reference to FIG. 3 above for purposes of clarity, however, the method is applicable to any of the circuits described herein. In an embodiment the method begins supplying an external clock signal CLK to clock generation circuit 300. The external clock signal CLK may be supplied as an input to the driving circuit 305 at 702. External clock signal CLK is also supplied to a gate of the first clock transistor NCLK at 704. The external clock signal CLK received by the driving circuit 305 may then be buffered through the driving circuit at 706, resulting in an output signal CLK_FAST having an improved slew as compared to CLK. At 708, signal CLK_FAST may then be output to drive transistor NCLK_FAST 310, which may be in parallel with first clock transistor NCLK. First clock transistor NCLK receives external clock signal CLK at approximately the same time that transistor NCLK_FAST receives signal CLK_FAST.

Then, at 710, an internal clock signal GCKP is generated from the input external clock signal. The clock signals turn on transistors NCLK and NLCK_FAST, and an enabling signal turns on the enabling transistor. The parallel transistors NCLK and NCLK_FAST provide two paths for a first internal clock signal GCKPB to discharge. The improved slew of the CLK_FAST signal may improve the slew of GCKPB allowing the signal to be pulled down faster and lower, preventing early reset and failure of internal clock signal generation. The GCKPB signal may be further processed through an inverter and output as an internal clock signal GCKP. At 712, internal clock signal GCKP may then be output from the clock generation circuit to a connected device such as a SRAM macro.

Circuits, devices, and methods are described herein. In one example, a clock generation circuit includes a first transistor having a gate connected to a clock signal, a second transistor connected in parallel to the first transistor, and a driving circuit connected to the second transistor and including an input and an output. The input of the driving circuit is connected to the clock signal, the output of the driving circuit is connected to a gate of the second transistor, and the driving circuit is configured to reduce the slew of the clock signal.

In another example, a memory device comprises a plurality of memory banks, with each memory bank including a plurality of memory cells. The memory device further comprising control circuitry configured to supply signals, including a first clock signal, to the plurality of memory bank, and a clock generation circuit configured to output the first clock signal to the control circuitry. The clock generation circuit further includes a driving circuit that is connected to a second clock signal and configured to output a third clock signal having a larger slew than the second clock signal.

In an example method of generating an internal clock signal, an external clock signal is supplied to a driving circuit, and buffered through the driving circuit to generate a signal having an reduced slew. The external clock signal is also supplied to a gate of a first transistor, and the reduced slew signal is supplied to a gate of a second transistor that is placed in parallel with the first transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the scope of the present disclosure.

It is claimed:

1. A clock generation circuit, comprising:
   a first transistor having a gate connected to a clock signal;
   a second transistor, connected in parallel to the first transistor;
   a third transistor connected to a first reference voltage and the first transistor;
   a fourth transistor connected to the first transistor and a second reference voltage; and
   a driving circuit, coupled to the second transistor, and comprising an input and an output,
   wherein the input of the driving circuit is connected to the clock signal, the output of the driving circuit is connected to a gate of the second transistor, and the driving circuit is configured to reduce a slew of the clock signal, the clock signal is an external clock signal, and the clock generation circuit is configured to generate an internal clock signal from the external clock signal.

2. The clock generation circuit of claim 1, wherein the third transistor has a gate configured to receive a reset signal, and the fourth transistor has a gate configured to receive an enabling signal.

3. The clock generation circuit of claim 1, wherein the driving circuit comprises:
   a first inverter comprising a first inverter input and a first inverter output, and
   a second inverter coupled to the first inverter, the second inverter comprising a second inverter input and a second inverter output;
   wherein the first inverter input comprises the input of the driving circuit, the first inverter output is connected to the second inverter input, and the second inverter output comprises the output of the driving circuit.

4. The clock generation circuit of claim 3, wherein the first transistor is a first clock transistor, the second transistor is a second clock transistor, the clock generation circuit further comprising:

a reset transistor connected to a first reference voltage and to the first clock transistor; and
an enabling transistor connected to a second reference voltage and to the first clock transistor.

5. The clock generation circuit of claim 4, further comprising:
   a latch configured to output an intermediate clock signal; and
   an inverter configured to receive the intermediate clock signal as input and output the internal clock signal.

6. The clock generation circuit of claim 1, wherein the driving circuit comprises:
   an inverter comprising an inverter input and an inverter output;
   a fifth transistor;
   a sixth transistor;
   a seventh transistor; and
   a eighth transistor, wherein:
     the inverter output comprises the output of the driving circuit,
     a source of the fifth transistor is connected to the first reference voltage,
     a drain of the fifth transistor is connected to a source of the fourth sixth transistor and to a source of the seventh transistor,
     a drain of the sixth transistor, a gate of the seventh transistor, and a drain of the eighth transistor are connected to the inverter input,
     a drain of the seventh transistor and a source of the eighth transistor are connected to the second reference voltage, and
     a gate of the fifth transistor, a gate of the sixth transistor, and a gate of the eighth transistor are connected to the clock signal.

7. The clock generation circuit of claim 6, wherein the fourth transistor is configured to enable generation of the internal clock signal.

8. The clock generation circuit of claim 6, wherein:
   the first transistor comprises a first n-type transistor;
   the second transistor comprises a second n-type transistor;
   the fifth transistor comprises a first p-type transistor;
   the sixth transistor comprises a second p-type transistor;
   the seventh transistor comprises a third p-type transistor; and
   the eighth transistor comprises a third n-type transistor.

9. The clock generation circuit of claim 8, wherein the fourth transistor is configured to enable generation of the internal clock signal.

10. The clock generation circuit of claim 9, wherein:
    the third transistor comprises a fourth p-type transistor, and the fourth transistor comprises a fourth n-type transistor.

11. A memory device comprising:
    a plurality of memory banks, each memory bank comprising a plurality of memory cells;
    control circuitry configured to supply signals to the plurality of memory banks, said signals including a first clock signal; and
    a clock generation circuit configured to output the first clock signal to the control circuitry,
    wherein the clock generation circuit comprises a driving circuit connected to a second clock signal and configured to output a third clock signal having a smaller slew than the second clock signal, the second clock signal is an external clock signal, the clock generation circuit is configured to generate the first clock signal from the external clock signal, and the driving circuit includes:

a third transistor;
a fourth transistor; and
a fifth transistor, wherein a first source/drain of the third transistor is connected to a first source/drain of the fourth transistor and to a first source/drain of the fifth transistor, a second source/drain of the fourth transistor and a gate of the fifth transistor are connected together.

12. The memory device of claim 11, wherein the control circuitry comprises a global input/output circuit, a local input/output circuit, a global control circuit, and a local control circuit.

13. The memory device of claim 11, wherein the memory device comprises a static random access memory (SRAM).

14. The memory device of claim 11, wherein the clock generation circuit further comprises:
a first transistor, wherein a gate of the first transistor is connected to the second clock signal; and
a second transistor, connected in parallel to the first transistor, wherein a gate of the second transistor is connected to the third clock signal.

15. The memory device of claim 14, wherein the driving circuit comprises:
a first inverter comprising a first inverter input and a first inverter output, and
a second inverter coupled to the first inverter, the second inverter comprising a second inverter input and a second inverter output;
wherein the first inverter input is connected between the driving circuit and the second clock signal, the first inverter output is connected to the second inverter input, and the second inverter output comprises the output of the driving circuit.

16. The memory device of claim 15, the first transistor is a first clock transistor, the second transistor is a second clock transistor, the memory device further comprising:
a reset transistor connected to a first reference voltage and to the first clock transistor;
an enabling transistor connected to a second reference voltage and to the first clock transistor;
a latch configured to output a fourth clock signal; and
an inverter configured to receive the fourth clock signal as input and output the first clock signal to the control circuitry.

17. The memory device of claim 14, wherein the driving circuit comprises:
an inverter comprising an inverter input and an inverter output;
a sixth transistor, wherein:
the inverter output comprises the output of the driving circuit,
a source of the third transistor is connected to a first reference voltage,
a drain of the third transistor is connected to a source of the fourth transistor and to a source of the fifth transistor,
a drain of the fourth transistor, the gate of the fifth transistor, and a drain of the sixth transistor are connected to the inverter input,
a drain of the fifth transistor and a source of the sixth transistor are connected to a second reference voltage, and
a gate of the third transistor, a gate of the fourth transistor, and a gate of the sixth transistor are connected to the second clock signal.

18. The memory device of claim 17, wherein the clock generation circuit further comprises:
a reset transistor connected to the first reference voltage and the first transistor,
wherein a gate of the reset transistor is connected to a reset signal, and the reset signal is supplied by the control circuitry.

19. A method for generating an internal clock signal, comprising:
supplying an external clock signal to a driving circuit;
buffering the external clock signal through the driving circuit to generate an reduced slew signal;
supplying the external clock signal to a gate of a first transistor;
supplying the reduced slew signal to a gate of a second transistor, wherein the second transistor is in parallel with the first transistor, wherein the driving circuit include a third transistor, a fourth transistor and a fifth transistor, a first source/drain of the third transistor is connected to a first source/drain of the fourth transistor and to a first source/drain of the fifth transistor, a gate of the third transistor and a gate of the fourth transistor are connected to the external clock signal; and
generating the internal clock signal from the external clock signal.

20. The method of claim 19, the method further comprising:
supplying a reset signal to a reset transistor connected between a first reference voltage and the first transistor; and
supplying an enabling signal to an enabling transistor connected between the first transistor and a second reference voltage.

* * * * *